G. F. GILLETTE.
ENGINE VALVE MECHANISM.
APPLICATION FILED FEB. 27, 1914.
1,115,660.
Patented Nov. 3, 1914.
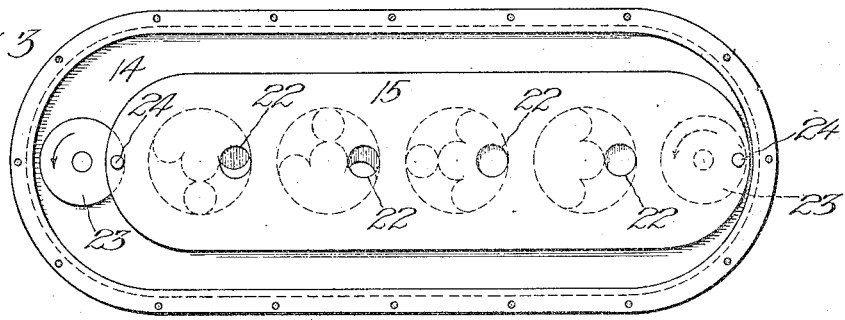
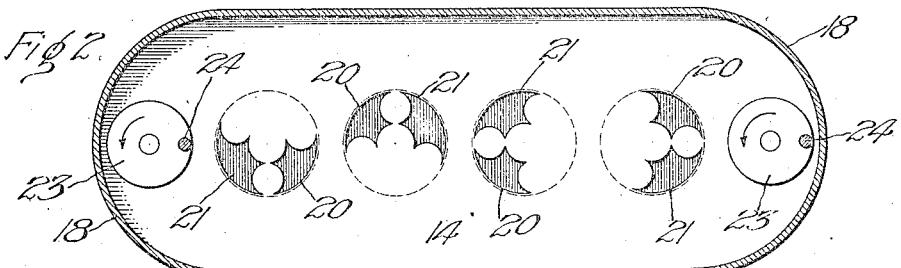
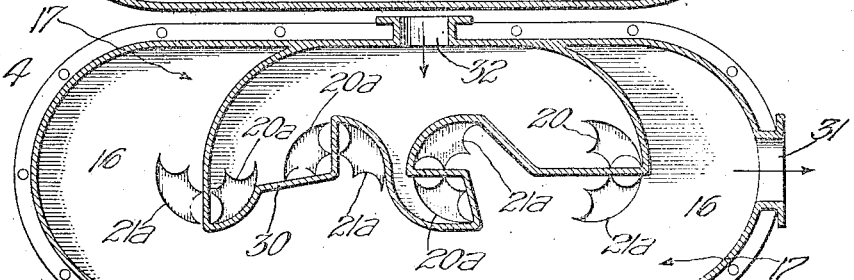
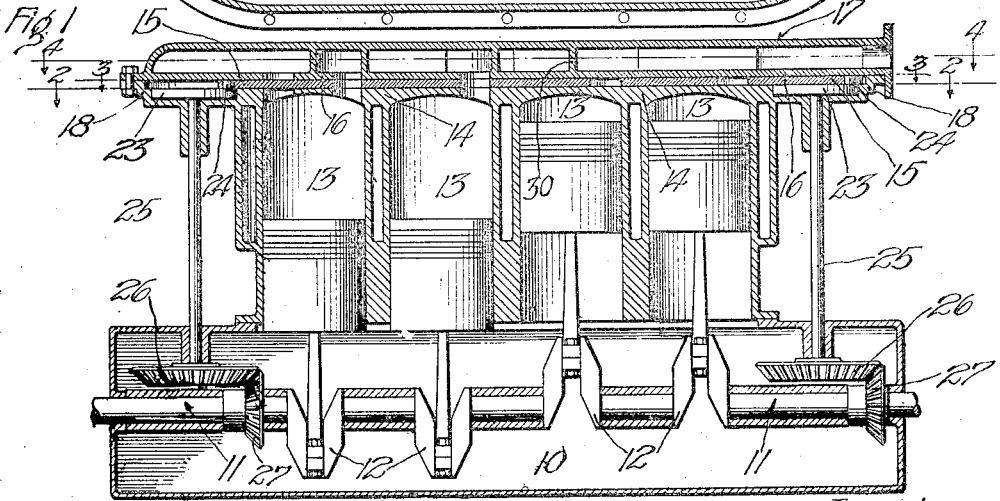
Witnesses
James P. Barry
Henrietta E. Bowman
Inventor
George F. Gillette
by Whittimore Hulbert & Whittimore
his Attorney

UNITED STATES PATENT OFFICE.

GEORGE F. GILLETTE, OF DETROIT, MICHIGAN.

ENGINE VALVE MECHANISM.

1,115,660. Specification of Letters Patent. Patented Nov. 3, 1914.

Application filed February 27, 1914. Serial No. 821,364.

*To all whom it may concern:*

Be it known that I, GEORGE F. GILLETTE, a citizen of the United States of America, residing at Detroit, in the county of Wayne and State of Michigan, have invented certain new and useful Improvements in Engine Valve Mechanism, of which the following is a specification, reference being had therein to the accompanying drawings.

This invention relates to a valve mechanism especially adapted for use in connection with an internal combustion engine; but the invention includes a construction which may be put to other uses besides those in connection with an internal combustion engine.

Although there are many different uses to which my invention may be applied, its utility is as great or greater in connection with an internal combustion engine than in connection with other mechanisms; and I therefore explain my invention and its uses in connection with an engine of the automobile type.

Fundamentally considered, my invention includes the combination of a flat valve base with suitable port or ports and a flat valve plate having a motion of gyration over the valve base. Heretofore, it has been the difficulty in plate valves either that different parts of the valve have different distances of travel over the base or that the valve plate does not have uniform motion. In the ordinary rotary plate valve the outer peripheral portions of the valve have a greater motion over the base than the inner portions, resulting in unequal wear and resulting eventually in leakage. In the type of valve where a reciprocating plate has been used there has been the disadvantage of non-uniform motion. My new valve combines the advantages of uniform motion with equal motion of all points in the valve plate.

The motion of my valve plate over the valve base may be broadly described as a motion of gyration in which separated points pass through similar non-concentric orbits. Thus where a single valve controls the ports of a plurality of cylinders, the movement will be the same for each cylinder and the ports will travel through similar orbits. There may be many means of attaining such a motion of the valve plate. Broadly speaking, this motion may be attained by revolving any point on the valve plate about any point on the base and by keeping any line in the valve plate parallel to itself during its motion of revolution. Specifically, I accomplish this motion by giving any two points of the valve plate synchronous motions of revolution about two fixed points on the base. Every point on the valve plate performs a motion of revolution about a corresponding point on the base; every point on the valve plate travels over a distance equal to that traveled by any other point; and the wear of the plate and the base is therefore uniform.

In the specific application of my valve mechanism to an internal combustion engine, I may preferably form the base or base plate of the valve directly on the heads of the engine cylinders, although this may be arranged in other manners. My valve may be applied to a single cylinder or to a plurality of cylinders. It lends itself very efficiently to the operation of a multi-cylinder engine, as it is only necessary to employ a single plate for any desired number of cylinders. I have shown this preferred application of my invention in the accompanying drawings, in which, Figure 1 is a longitudinal vertical section showing a multi-cylinder engine equipped with my valve, Fig. 2 is a horizontal section taken on line 2—2 of Fig. 1, Fig. 3 is a horizontal section taken on line 3—3 of Fig. 1, Fig. 4 is a horizontal section taken on line 4—4 of Fig. 1.

In the drawings, the numeral 10 may designate a suitable crank case carrying the crank shaft 11 in suitable bearings, the crank shaft having the ordinary cranks 12 arranged in the usual relative position. I have shown the cylinders 13 cast in one piece; although this is not necessarily the case. And I have also shown the valve base 14 as being formed integrally with the heads of the cylinders. It will be seen that this construction is not imperative, although it makes simple the application of my valve to a multi-cylinder engine. The valve base 14 is flat on its upper face and the valve plate 15 lies flatly on the upper face of the base, being confined by the lower plate 16 of the inlet and exhaust manifold casting 17. Around the outer edges of the base 14 a flange 18 is raised, and the casting 17 is secured to this flange so that the valve plate 15 is completely housed in.

The base 14 of the valve has an inlet and exhaust port 20 and 21 for each of the cylinders extending through the base to the head of the respective cylinders. The ports for each cylinder are arranged circumferentially about any determined axis; and, for simplicity, I arrange each set of ports about the axis of the corresponding cylinder. It will be noted that the ports are at a uniform radial distance from the corresponding axes, and that they are of uniform radial width. The exhaust ports are of somewhat greater circumferential extent than the inlet ports; and the end configuration of all the ports is circular, so that the registration of the circular plate ports 22 with the base ports 20 and 21 will be as nearly full and instantaneous as possible.

The plate 15 may be of any suitable configuration and is provided with circular ports 22 corresponding in number to the number of cylinders and number of sets of ports 20 and 21. The ports 22 are preferably of diameter equal to the radial width of the ports 20 and 21. The plate 15 is moved by a crank mechanism embodying two cranks 23 having crank pins 24 connected directly with the plate 15, the radius of the pins 24 from the crank shaft 25 being equal to the average radius of the ports 20 and 21 from their respective axes. The cranks 23 with their pins 24 are originally set in the same phase of movement; for instance, the pins 24 may be both set on the line through the two crank shafts 25. Means are then employed to drive the two cranks in the same direction at equal speed. In Fig. 1 I have shown beveled gears 26, 27 connecting the valve cranks with the engine crank shaft 11 so that both valve cranks are driven at the same speed in the same direction. Suppose now, that the plate is in the position shown; then the ports 22 will be in relative positions shown, being at the right hand extremities of their circular motions, and being in this specific case all on a line of the axis drawn through the two valve cranks and through the axes of the several cylinders. Rotation of the two cranks in the direction indicated will cause rotation of the several plate ports about the several cylinder axes and will cause the plate ports to travel over the base ports 20 and 21, the plate ports traveling first over the exhaust port 21 and then over the intake port 20, in each instance.

The "timing" of the several cylinders is accomplished by placing the corresponding ports at different positions about the respective axes. In the arrangement shown, the timing is one, three, two, four, numbering the cylinders from the right hand end. The timing of the valve with one or all cylinders involves simply the setting of the gears 26, 27. In the position shown, the piston in the right hand cylinder is ready to begin its downward suction stroke and the right hand valve port 22 is just ready to register with the inlet port 20 for that cylinder. The piston in the third cylinder is just beginning its exhaust stroke, and the corresponding valve port has just registered with the exhaust port 21 before the piston begins its upstroke. The piston in the second cylinder is just beginning its downward firing stroke; and the fourth piston is just beginning its upward compression stroke.

The bottom plate 16 of the manifold casting 17 has ports 20$^a$ and 21$^a$ similar to and directly above ports 20 and 21 respectively. There may be a division wall 30 in the manifold, dividing the manifold into exhaust and intake compartments; and suitable exhaust outlet 31 and inlet 32 may be arranged conveniently on the manifold. It is not necessary that the arrangement of manifold above the plate be exactly as shown; I have shown this arrangement as a simple form to carry out and complete the functions of my valve mechanism for multi-cylinder engines.

As hereinbefore stated, I do not limit myself to the details of construction and application of my valve mechanism. The primary and fundamental features of my valve are contained in the base with its ports and the gyrating plate with its ports moving on the base. The extent and configuration of the various ports are of minor importance; as is also the manifold or other construction above the plate 15.

I claim—

1. A valve mechanism, comprising a stationary valve base having a port therein, a valve plate having a coöperating port adapted to register with the base port during a part of the valve movement, a pair of operating cranks for the valve plate having pins connected with the plate, so that there are two points on the valve plate constrained to move in rotation about the two cranks, and means to rotate said cranks in synchronism.

2. A valve for internal combustion engines and the like, comprising a stationary valve base having a port leading to the engine cylinder, a flat valve plate resting on the base having a coöperating port, a pair of operating cranks for the valve with axes normal to the plane of the plate, the pins of the cranks being at a common radius from their respective axes and connected directly to the plate, and means for causing synchronous rotation of the cranks.

3. A valve mechanism for multi-cylinder internal combustion engines or the like, comprising a flat stationary base with ports leading to the several cylinders, the ports for each cylinder being circumferentially arranged about an individual axis at a common radius, a flat valve plate on the base having a port for each of said cylinders adapted to register with the corresponding cylinder port, all the plate ports having a common position relative to the respective axes about which the base ports are circumferentially arranged, a pair of valve operating cranks with axes normal to the plane of the valve base and plate and with crank pins directly connected with the plate at a radius from the respective crank axes equal to the radius of the plate ports from the port axes, and means to rotate said cranks in synchronism.

4. A valve mechanism for multi-cylinder internal combustion engines, comprising a flat valve face having inlet and exhaust ports therein for the respective cylinders, a flat valve having ports for coöperation with the ports in said valve face, and means for imparting to said valve a gyratory movement such as to alternately register the parts in the valve with the inlet and exhaust ports of the valve face and with unequal time intervals corresponding to the cycle of a gas engine, said ports in said valve and valve face being relatively positioned for sequential registration in the several cylinders.

5. A valve for internal combustion engines or the like, comprising a flat base having a plurality of ports therein, a flat valve having a port for coöperation with the base ports, and means to impart to said valve a gyratory movement such as to cause the alternate registration of said valve port with said base ports and with unequal time intervals therebetween corresponding to the cycle of an explosion engine.

6. A valve mechanism in a multiple-cylinder engine, comprising a stationary base plate having a plurality of ports therein, a ported valve member common to said cylinders, and means for imparting a gyrating movement to said member such that each port in said member will successively engage its respective ports in said base plate at unequal time intervals.

In testimony whereof I affix my signature in presence of two witnesses.

GEORGE F. GILLETTE.

Witnesses:
JAMES P. BARRY,
HENRIETTA E. BOWMAN.